UNITED STATES PATENT OFFICE.

SADAKICHI SATOW, OF SENDAI, JAPAN.

CELLULOID-LIKE SUBSTANCE AND PROCESS OF MAKING THE SAME.

1,245,976.  Specification of Letters Patent.  Patented Nov. 6, 1917.

No Drawing.  Application filed December 11, 1916. Serial No. 136,296.

*To all whom it may concern:*

Be it known that I, SADAKICHI SATOW, a subject of the Emperor of Japan, residing at Sendai, Japan, have made a certain new and useful Invention in Celluloid-Like Substances and Processes of Making the Same, (Case I,) of which the following is a specification.

This invention relates to condensation products of vegetable proteids, and process of making the same.

The object of the invention is to produce a celluloid-like substance capable of being utilized in the manufacture of various commercial products, having any desired degree of flexibility, elasticity, hardness and transparency, and an economical and efficient process of manufacturing such substance.

In carrying out my invention I employ either in the form of a dry powder or of wet cakes, or otherwise, vegetable proteids or proteidal substances, such as are obtained from suitable proteid-containing material. The proteids are subjected to the action of a suitable acidic glutinizing agent. The resulting product is then dried and treated with a suitable condensing agent and finally molded into the desired form. The order in which the condensing agent is employed may be varied. That is this agent may be employed either before or after molding the final product. The resulting product is a celluloid-like substance having the desired flexibility, elasticity, strength, hardness and transparency, according to the combinations and relative properties of the various agents employed, which substance is suitable for use in the manufacture of various commercial products.

The proteid or proteidal substances required in carrying out my invention are obtained from any suitable raw material which contains vegetable proteids, such as beans, peas, wheat, corn, or other leguminous, cereal or grain products.

The proteid containing raw material is crushed to break down the cellular structure thereof, and if it contains an undesirable percentage of oil, the oil content is removed. This may be effected in any suitable manner, as, for example, by treating the mass with an oil solvent such as benzin. The oil solvent is then removed from the mass. The proteidal substances contained in the "meal" or "proteid meal" thus produced, are separated therefrom to produce a refined proteid product. This separation of the proteidal substances from the proteid meal may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom. The further purification referred to may be accomplished by filtration, centrifuging or the like, by fractional precipitation, fractional solution of precipitated impure proteids, or by converting one or more components into other chemical compounds having different properties which enable their separation to be effected, or one or more of these various purifying methods may be employed in combination with the others. The precipitation of the refined proteidal substances is accomplished by adding a suitable acid such as sulfuric, sulfurous, acetic or phosphoric, or by adding a suitable ferment such as lactic or acetic.

According to another method the meal is treated with water and the refined proteidal products are precipitated out of the resulting liquid, either with or without purification thereof, as above explained, the precipitation being effected with an acid or a ferment as above described.

According to still another method the meal is treated with an aqueous salt solution, such as sodium chlorid, ammonium sulfate, or the like, and the resulting liquid, either with or without further purification, as explained, is subjected to dialysis.

The proteids obtained as above described are then subjected to the action of a suitable acid to act thereon as a glutinizing agent. I have found that the following are suitable agents to be employed, namely, (1) inorganic acids, such as phosphoric acid, sulfurous acid, or the like; or (2) fatty or oxy-fatty acids, such as formic, acetic, propionic, phenyl-propionic, malonic, lactic, tartaric, citric, malic, and the like; or (3) aromatic acids, such as salicylic, benzoic, or the like; or (4) phenols, such as carbolic acid, cresol, resorcin, nitro-cresol, and the like.

The acid agent reacts chemically upon the proteids and appears to combine with amino groups of the proteid molecules, the amount of the acid employed controlling the amount thereof which enters into combination with the amino groups of the proteid, and hence controlling the degree of flexibility, elasticity, hardness and transparency of the product.

In subjecting the proteids to the action of the acidic agent, the proteids are kneaded or otherwise thoroughly mixed with the acid, and, if desired, any excess of water is removed by vacuum treatment, or otherwise. In this manner the proteids are converted into their soluble derivatives, thereby producing a transparent and colorless, or nearly colorless plastic, viscid sticky mass which can be molded into any desired form and dried. The dried product is then hardened by immersing the same into a solution of a suitable condensing agent. If desired, however, the condensing agent may be incorporated into the mass before the molding operation, by kneading the mass with the condensing agent and then molding and drying the product.

I have found that an active methylene compound, such as formaldehyde, hexamethylenetetramin, trioxymethylene, or other aldehydes of aliphatic and aromatic series, is suitable for use as a condensing agent.

I will now give some concrete illustrations of the manner of carrying out my invention.

Example 1: The proteid or soja bean, glycinin, is dissolved in formic acid at a low temperature. If necessary to effect the solution of the proteid the temperature may be raised to about 50° C. The excess of the formic acid and water is evaporated under a high degree of vacuum. The viscid mass thus obtained is molded into the desired shape and dried after which the molded article is hardened by being immersed in a solution of formaldehyde.

Example 2: One hundred pounds of corn proteid, zein, in the form of a freshly precipitated cake is thoroughly kneaded or otherwise mixed with three and one half gallons of concentrated solution of malic acid, the proteids thereby being reduced to a viscid gelatinous mass. Into this mass is then kneaded or mixed formalin, and the resulting product is molded and dried.

If desired suitable viscous plastic material, such as hydrocellulose, oxy-cellulose or cellulose-esters, which substances I will call herein cellulose derivatives, or other viscous substances, as well as any suitable organic or inorganic filling material such as cotton, or other fibrous material, may be incorporated into the mass. Also, if desired, a suitable pigment may be added to the mass.

The product obtained as above described is a celluloid-like substance, is non-inflammable, waterproof and acid proof. It is a good insulator of electricity and may be used as a substitute for ebonite, celluloids, bakelite, ivory, marble or the like.

Having now set forth the object and nature of my invention and various methods of carrying the same into practical operation, what I claim as new and useful and of my own invention, and desire to secure by Letters Patent is—

1. In the manufacture of celluloid-like substances, the process which consists in glutinizing vegetable proteids and then condensing the glutinized mass with an active methylene compound.

2. In the manufacture of celluloid-like substances the process which consists in glutinizing vegetable proteids with an acid and then condensing the glutinized mass with an active methylene compound.

3. In the manufacture of celluloid-like substances, the process which consists in subjecting proteids to the action of a glutinizing acid and then condensing the glutinized mass.

4. In the manufacture of celluloid-like substances, the process which consists in subjecting proteids to the action of an acid to glutinize the same and then to the action of a condensing agent.

5. In the manufacture of celluloid-like substances, the process which consists in first subjecting proteids to the action of a glutinizing agent then to an active methylene compound.

6. In the manufacture of celluloid-like substances, the process which consists in first subjecting proteids to the action of an organic acid to glutinize the same and then to a condensing agent.

7. In the manufacture of elastic, plastic celluloid-like substances, the process which consists in subjecting vegetable proteids to the action of a fatty acid to glutinize the same and then subjecting the glutinized mass to a condensing agent.

8. In the manufacture of elastic, plastic celluloid-like substances, the process which consists in subjecting vegetable proteids to the action of an organic acid to glutinize the same and then subjecting the glutinized mass to an active methylene compound.

9. In the manufacture of celluloid-like substances, the process which consists in subjecting vegetable proteids to the action of a glutinizing acid and then to the action of formaldehyde.

10. In the manufacture of celluloid-like substances, the process which consists in glutinizing vegetable proteids with an acidic agent and then treating the mass with formaldehyde.

11. In the manufacture of celluloid-like substances, the process which consists in glutinizing vegetable proteids with an acidic agent and treating the mass with formaldehyde.

12. In the manufacture of celluloid-like substances, the process which consists in glutinizing vegetable proteids with an organic acid and treating the glutinized mass with formaldehyde.

13. In the manufacture of celluloid-like substances, the process which consists in glutinizing vegetable proteids with a fatty acid and treating the glutinized mass with formaldehyde.

14. In the manufacture of celluloid-like substances, the process which consists in subjecting proteids to the glutinizing action of an oxy-fatty acid and then subjecting the glutinized mass to the action of a condensing agent.

15. In the manufacture of celluloid-like substances, the process which consists in glutinizing vegetable proteids with an oxy-fatty acid and subjecting the glutinized mass to the action of an active methylene compound.

16. In the manufacture of celluloid-like substances, the process which consists in glutinizing vegetable proteids with an oxy-fatty acid and subjecting the glutinized mass to the action of formaldehyde.

17. In the manufacture of celluloid-like substances, the process which consists in glutinizing vegetable proteids and incorporating a viscous plastic substance into the mass, and finally condensing the same with an active methylene compound.

18. In the manufacture of plastic, elastic celluloid-like substances, the process which consists in glutinizing vegetable proteids and incorporating fibrous material into the mass, and finally condensing the same with an active methylene compound.

19. In the manufacture of plastic, elastic celluloid-like substances, the process which consists in glutinizing vegetable proteids and incorporating cellulose derivatives into the mass, and finally condensing the same with an active methylene compound.

20. In the manufacture of plastic, elastic celluloid-like substances, the process which consists in glutinizing vegetable proteids and incorporating cellulose derivatives and fibrous material into the mass, and finally condensing the same with an active methylene compound.

21. A plastic, elastic celluloid-like substance as a new article of manufacture, consisting of a condensation product of vegetable proteid glutinized with an acid, with an active methylene compound.

22. A celluloid-like substance as a new article of manufacture, consisting of a condensation product of vegetable proteid glutinized with an acid, with formaldehyde.

23. A plastic, elastic celluloid-like substance as a new article of manufacture, consisting of a condensation product of glutinized vegetable proteid glutinized with an acid, with an active methylene compound, and a viscous plastic substance.

24. A celluloid-like substance as a new article of manufacture, consisting of a condensation product of glutinized vegetable proteid with an active methylene compound, a viscous plastic substance and fibrous material.

25. A celluloid-like substance as a new article of manufacture, consisting of an acidic compound of vegetable proteids with a condensing agent.

26. A celluloid-like substance as a new article of manufacture, consisting of an acidic compound of vegetable proteids with an active methylene compound.

27. A celluloid-like substance as a new article of manufacture, consisting of an acidic compound of vegetable proteids with formaldehyde.

28. In the manufacture of celluloid-like substances, the process which consists in glutinizing vegetable proteids with an acid and treating the glutinized mass with an active methylene compound and varying the physical characteristics of the resulting mass by varying the amount of the acid.

29. A celluloid-like substance as a new article of manufacture consisting of a condensation product of vegetable proteid glutinized by an acid with an active methylene compound, and cellulose derivatives.

30. A celluloid-like substance as a new article of manufacture consisting of a condensation product of vegetable proteid glutinized by an acidic agent with an active methylene compound, cellulose derivatives and fibrous material.

31. In the manufacture of celluloid-like substances, the process which consists in glutinizing vegetable proteids and incorporating a viscous plastic substance into the mass.

In testimony whereof I have hereunto set my hand on this 1st day of December, A. D., 1916.

SADAKICHI SATOW.